March 17, 1964 C. D. SLOAN 3,125,697
PERMANENT MAGNET EDDY CURRENT DEVICE
Filed Nov. 28, 1960
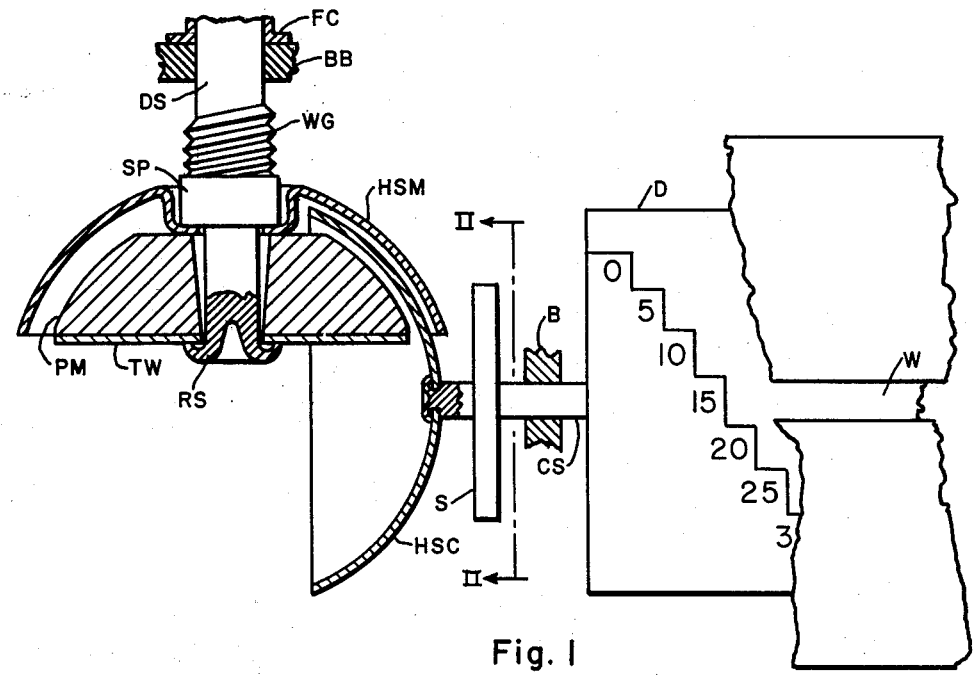
Fig. 1
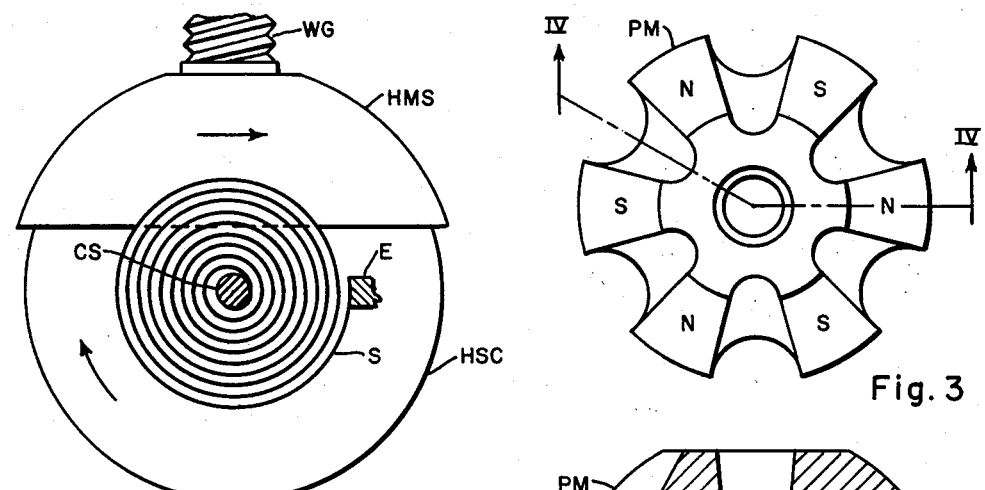
Fig. 2
Fig. 3
Fig. 4
WITNESSES
Leon J. Taga
James T. Young
INVENTOR
Carroll D. Sloan
BY
Paul E. Friedemann
ATTORNEY

United States Patent Office 3,125,697
Patented Mar. 17, 1964

---

3,125,697
PERMANENT MAGNET EDDY CURRENT DEVICE
Carroll D. Sloan, Murrysville, Pa., assignor to Westinghouse Electric Corporation, East Pittsburgh, Pa., a corporation of Pennsylvania
Filed Nov. 28, 1960, Ser. No. 72,141
5 Claims. (Cl. 310—97)

This invention relates to an eddy current producing device and more particularly to a device for producing relative movement between a permanent magnet and an eddy current producing element and for indicating the speed of relative movement between the magnet and the eddy current producing element.

For many years automotive speedometers have made use of a rotating permanent magnet bar which is mounted to be rotatable about an axis perpendicular to the mid-portion of its length and perpendicular to the instrument panel. This magnet bar is disposed inside of a co-axial cylindrical drag cup device and, operating on an eddy current principle in co-action with a magnetic member outside of the cup, provides a drag on the cup proportional to the angular velocity of the magnet. In this arrangement the drag cup, carrying a pointer or indicator co-acting with a dial and being restrained by a spring will indicate on the dial the angular velocity of the magnet. The drive cable is coupled to the magnet and the indicator is calibrated to read miles per hour. In most cases the drive cable can be run directly through the wall with a minimum of bending so as to cause the pointer, which rotates on an axis perpendicular to the plane of the instrument panel, to rotate in a plane substantially parallel to the instrument panel.

Recent automotive design trends however require the rotation of a drum or cylinder instead of a pointer. In this arrangement the drum axis is substantially parallel to the instrument panel and a bend of 90° in the driving cable is required. This 90° bend in the drive cable has resulted in a great amount of mechanical difficulty.

In order to eliminate the 90° bend in the drive cable, various gear arrangements have been used, but the noise level is objectionable and additional manufacturing costs are involved.

As an alternate to the gear arrangement, it has been proposed to place a disc of conductive material on the shaft of a spring restrained drum and adjacent the magnets and place a magnetic member on the drum side of the disc to complete the magnetic circuit. The magnet is to be of a ring type with poles on the circumference to coact with the flat disc. While this design eliminates the gears it has a group of disadvantages from an efficiency standpoint, to wit:

(1) Most of the poles of the magnet are not effective, at any instant, that is, only the poles close to the flat disc are effective at any one time.

(2) The effective air gap between the magnet poles, the flat disc and other parts of the magnetic circuit is relatively large due to the tangential arrangement.

(3) The return path of the flux through the yoke, namely the other parts of the magnetic circuit, is relatively long because of the difficult configuration necessary to clear the flat disc. The reluctance of the magnetic circuit is thus high.

(4) Any deviation from the designed 90° relationship will increase mechanical clearances between the periphery of the magnet and the drag disc to thus further increase the effective air gap.

It is a broad object of this invention to provide an efficient and reliable drag coupling between the drive shaft of an eddy current device and a drum driven on an axis generally perpendicular to the drive shaft.

Another object of this invention is to improve the performance and efficiency of a substantially 90° bend permanent magnet drag cup arrangement for an eddy current device.

The objects recited are merely illustrative. Other objects of this invention and advantages thereof will become more apparent from a study of the following specification and the accompanying drawing, in which:

FIGURE 1 is a distorted plan view with certain parts in section, of all the essential features of this invention;

FIG. 2 is a view on section line II—II of FIG. 1 showing the restraining spring and the co-acting cups of spherical segments;

FIG. 3 is a view of the permanent magnet as seen from the rear; and

FIG. 4 is a sectional view of the permanent magnet taken on section line IV—IV of FIG. 3.

In FIG. 1 the speed indicating drum D is shown as an elongated cylinder and is shown provided with numbers that appear at the instrument window W as the drum is displaced angularly about its axis in proportion to the speed of rotation of the drive shafts DS mounted in the flexible cable FC suitably secured to the bearing base BB.

The drum, or cylinder, D has a shaft CS disposed substantially parallel to the instrument panel and is mounted in suitable bearings only one of which, as bearing B, is shown in FIG. 1.

The speed indicating numbers are disposed to be both circumferentially and axially spaced, as shown. This has the advantage that the higher speed numbers also move to the right at the window W. The arrangement could, of course, be such that the higher speed numbers move to the left. The driver of the vehicle provided with this invention gets a speed indication from the number as well as the position of the number.

The axial spacing of the numbers, though preferable, is not a necessity. The drum could be a short cylinder with the numbers in one plane transverse of the drum axis and a relatively small rectangular window to show the speed indicating number. This structure, of course, presupposes the spiral restraining spring S is so chosen that the drum even for the highest speed makes somewhat less than one turn.

The important feature of this invention is the drag, or torque, coupling between the drive shaft DS and the cylinder shaft CS.

The drive shaft is at its front end provided with a rivet-like stem RS, a shoulder portion SP and a worm gear WG for driving a suitable odometer. A segment of a hollow sphere HSM of magnetic material, having the depressed well and bottom opening to receive the stem RS, is disposed against the shoulder portion SP as shown. A permanent magnet PM having six poles, alternately north and south and generally having the shape of a segment of a sphere, is disposed on the rivet stem RS as shown with the poles on the curved surface of the segment and, through a relatively short constant length air gap, concentrically facing the segment of the hollow sphere HSM. A relatively tough stiff washer TW of temperature compensating material is disposed at the front of the magnet. This temperature compensating material may comprise a material such as the approximately 30% nickel iron alloy. This temperature compensator comprises the flat plate TW along the bottom side of the magnet PM and has characteristics to shunt more or less the flux threading the eddy current spherical segment HSC with changes of temperature. In other words, the flux threading the spherical segment HSC remains substantially constant regardless of the changes in temperature ambient to the magnet PM.

The disc or washer TW may be of any metal that provides such temperature compensation. When the parts are thus disposed the rivet stem RS is peaned over as shown to rigidly hold the segment of the hollow sphere HSM, the permanent magnet PM, and the washer TW on the drive shaft to thus rotate with it when it rotates.

The left end of shaft CS is also provided with a rivet stem, as shown, upon which a segment of a hollow sphere HSC of conducting material is rigidly mounted. This segment HSC is disposed concentrically of the segment of the sphere HSM and is disposed in equal spacing between the permanent magnet PM and the segment HSM.

Thus when the shaft DS rotates the rotating magnetic field produces eddy currents in the segment HSC and drags this segment with the magnet PM and segment HSM an amount determined by the speed of shaft DS and the restraining action of spring S. The spring at its outer end is secured to a suitable element E on the instrument housing and at its inner end is secured to the shaft CS. For the showing made the assumption is that shaft DS rotates clockwise when viewed from the front. Segment HSC, as seen in FIG. 2, thus rotates clockwise turning shaft CS clockwise to wind up spring S. The drum is thus displaced angularly as a function of the speed of shaft DS. The showing of the window and drum have, in FIG. 1, been turned clockwise by 90° as seen from the right out of the true position. In this sense FIG. 1 is distorted.

The permanent magnet may be any magnet that does not lose its magnetic strength with age nor is affected to any extent by temperature changes and the relatively high temperature with respect to ambient that may occur at the location of the magnet.

Ceramic permanent magnets while having a high flux density are rather sensitive to temperature. The best magnets are those known in the trade as Alnico magnets. These Alnico magnets comprise an alloy of aluminum, 8% to 12.5%, nickel, 14% to 28%, cobalt, 5% to 24% with the rest mostly iron. Some include small amounts of copper and tin. Alnico III is probably the best for the purpose.

This sensitivity to temperature of the ceramic magnets does not preclude their use. Regardless of any permanent magnet used it is only necessary to select a washer TW that has temperature compensating magnetic characteristics that match the magnet chosen so that the torque transmitted is only a function of the speed of shaft DS.

In the actual construction, the segment of a hollow sphere HSM of magnetic material may be made of steel having a thickness of .025 inch and an inside radius of .850 inch.

The segment of a hollow sphere HSC of conducting material may be of aluminum having a thickness of .045 inch, and an inside radius of .778 inch.

When the mean spherical radius of the magnet and yoke, namely segment HSM, is the same as the mean spherical radius of the drag cup, namely segment HSC, as is the case in this invention, each member is free to rotate on its axis with no mechanical interference. This invention thus has the following advantages:

(1) The drag cup, segment HSC, covers a greater percentage of the total number of poles of the magnet PM thereby increasing the torque.

(2) The high permeability yoke, or segment HSM, is simple to mount in position either on the rotating shaft, as herein disclosed and shown or, it may be fixed on part of the frame.

(3) The segment HSM provides for a minimum gap to the magnet at all times and the air gap flux density is retained at a maximum.

(4) Deviation over a considerable number of degrees from the designed 90° relationship between shafts DS and CS is possible without serious effect upon the torque and without decreasing mechanical clearance.

While the disclosure is mainly directed to an instrument for indicating the speed of a vehicle, the invention is broader and is directed to a spherical torque coupling, based upon the eddy current principle, between two rotating members.

I claim as my invention:

1. In a force transmitting device operating on an eddy current principle, in combination, a first rotatable member comprising a permanent magnet in the form of a segment of a sphere, a fixed member comprising a cup of magnetic material in the form of a segment of a spherical shell fixedly disposed about said magnet in concentric spaced relation, a second member comprising a drag cup of high electrical conductivity in the form of a segment of a spherical shell disposed in spaced mating arrangement concentrically about said magnet and in spaced mating arrangement concentrically within said fixed member, whereby rotation of said first member about its axis with respect to said second member induces a similar rotational tendency in said second member, the rotational axis of said second member with respect to said first member comprising the magnet being displaced approximately, but not necessarily, 90° apart.

2. In a torque transmitting device operating on an eddy current principle, in combination, a first rotatable member comprising a permanent magnet in the form of a segment of a sphere having a magnetic pole in its curved surface and having an axis of rotation including a radius of said sphere and center of the segment, a shell of magnetic material in the form of a segment of a sphere disposed concentrically about the magnet in spaced relation to it, and a second rotatable member, comprising a drag cup of electrically conductive material in the form of a segment of a spherical shell disposed in concentric mating relation to the magnet in the space between the magnet and shell and in spaced relation to both the shell and magnet, said second member having an axis of rotation including a radius of its sphere and the center of its segment, said axis of rotation of the two members being displaced approximately 90° apart.

3. In a torque transmitting device operating on an eddy current principle, in combination, a first rotatable member comprising a permanent magnet in the form of a segment of a sphere having a magnetic pole in its curved surface and having an axis of rotation including a radius of said sphere and center of the segment, a shell of magnetic material in the form of a segment of a sphere disposed concentrically about the magnet in spaced relation to it, and a second rotatable member, comprising a drag cup of electrically conductive material in the form of a segment of a spherical shell disposed in concentric mating relation to the magnet in the space between the magnet and shell and in spaced relation to both the shell and magnet, said second member having an axis of rotation including a radius of its sphere and the center of its segment, said axis of rotation of the two members being displaced approximately 90° apart, said second member being provided with resilient means for restraining its rotation, whereby the second member will be angularly displaced about its axis of rotation in proportion to the angular velocity of the first member.

4. In a force transmitting device operating on an eddy current principle, in combination, a first rotatable member comprising a permanent magnet in the form of a segment of a sphere, a plate of temperature compensating material disposed adjacent the flat portion of the magnet, a fixed member comprising a cup of magnetic material in the form of a segment of a spherical shell fixedly disposed about said magnet in concentric spaced relation, a second rotatable member comprising a drag cup of high electrical conductivity in the form of a segment of a spherical shell disposed in spaced mating arrangement concentrically about said magnet and in spaced mating arrangement concentrically within said fixed member, whereby rotation of said first member about its axis with respect to said second member induces a similar rotational tendency in said second member, the rotational axis of said second member with respect to said first member comprising the magnet being displaced approximately, but not necessarily, 90° apart.

5. In a torque transmitting device operating on an eddy current principle, in combination, a first rotatable member comprising a permanent magnet in the form of a segment of a sphere having a magnetic pole in its curved surface and having a temperature compensating magnetic material fitted against its flat surface and having an axis of rotation including a radius of said sphere and center of the segment, a shell of magnetic material in the form of a segment of a sphere disposed concentrically about the magnet in spaced relation to it, and a second rotatable member, comprising a drag cup of electrically conductive material in the form of a segment of a spherical shell disposed in concentric mating relation to the magnet in the space between the magnet and shell and in spaced relation to both the shell and magnet, said second member having an axis of rotation including a radius of its sphere and the center of its segment, said axis of rotation of the two members being displaced approximately 90° apart, said second member being provided with resilient means for restraining its rotation, whereby the second member will be angularly displaced about its axis of rotation in proportion to the angular velocity of the first member.

References Cited in the file of this patent

UNITED STATES PATENTS

| | | |
|---|---|---|
| 1,702,726 | Dorsey | Feb. 19, 1929 |
| 2,840,731 | Kupku | June 24, 1958 |

FOREIGN PATENTS

| | | |
|---|---|---|
| 579,051 | Germany | June 21, 1933 |
| 1,183,165 | France | Jan. 26, 1959 |